United States Patent [19]
Fortune

[11] Patent Number: 5,215,343
[45] Date of Patent: Jun. 1, 1993

[54] NUDGE BARS
[75] Inventor: William C. Fortune, Hitchin, United Kingdom
[73] Assignee: Jib Engineering Ltd., England
[21] Appl. No.: 829,048
[22] PCT Filed: Aug. 10, 1990
[86] PCT No.: PCT/GB90/01255
 § 371 Date: Feb. 7, 1992
 § 102(e) Date: Feb. 7, 1992
[87] PCT Pub. No.: WO91/01904
 PCT Pub. Date: Feb. 21, 1991

[30] Foreign Application Priority Data
 Aug. 11, 1989 [GB] United Kingdom ............... 8918388
[51] Int. Cl.⁵ ............................................. B60R 19/02
[52] U.S. Cl. .................................. 293/121; 293/115; 293/144; 293/146
[58] Field of Search .................. 293/121, 120, 102, 38, 293/142, 143, 144, 155, 112, 146, 148, 115, 123, 130

[56] References Cited
U.S. PATENT DOCUMENTS

| | | | |
|---|---|---|---|
| 3,431,005 | 3/1969 | Priefert | 293/144 X |
| 3,610,609 | 10/1971 | Sobel | 293/143 X |
| 3,677,594 | 7/1972 | Gussack et al. | 293/143 |
| 4,168,855 | 9/1979 | Koch | 293/115 |
| 4,469,360 | 9/1984 | Drury . | |
| 4,586,739 | 5/1986 | Loren et al. | 293/120 |
| 4,671,552 | 6/1987 | Anderson et al. | 293/144 |

FOREIGN PATENT DOCUMENTS 1574863 7/1969 France .
1329851 9/1973 United Kingdom .

Primary Examiner—Russell D. Stormer
Assistant Examiner—Joseph D. Pape
Attorney, Agent, or Firm—Davis, Bujold & Streck

[57] ABSTRACT

A nudge bar of the kind comprising a pair of spaced vertical bars whose front surfaces provide the most forward parts of the nudge bar, one for either side of the vehicle radiator and a horizontally extending elongate loops connected with the two vertical bars. At least the front part of each vertical bar is formed as a moulding of resilient plastics or rubber material. A particularly suitable material is a semi-rigid, self skinning, foamed polyurethane. Preferably, a metal insert in the form of a strip extends through each moulding to strengthen it and, where appropriate, to facilitate fixing. In a preferred arrangement, each vertical bar comprises a rear metal part and a front moulded part, the metal part providing projecting front edges which mate with corresponding grooves in the moulded part, and a plate is provided in the metal part, adjacent the front edges, and on which the moulded part seats when fitted.

7 Claims, 5 Drawing Sheets

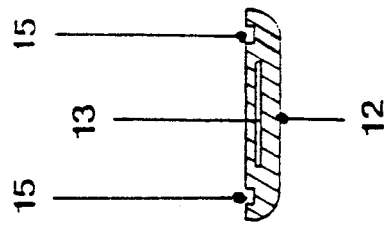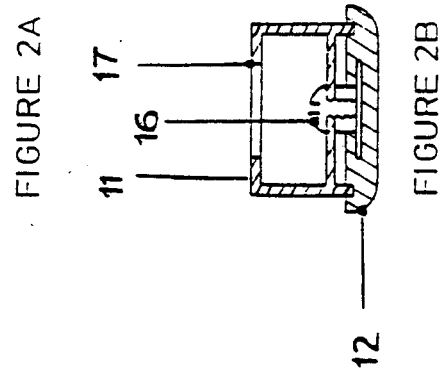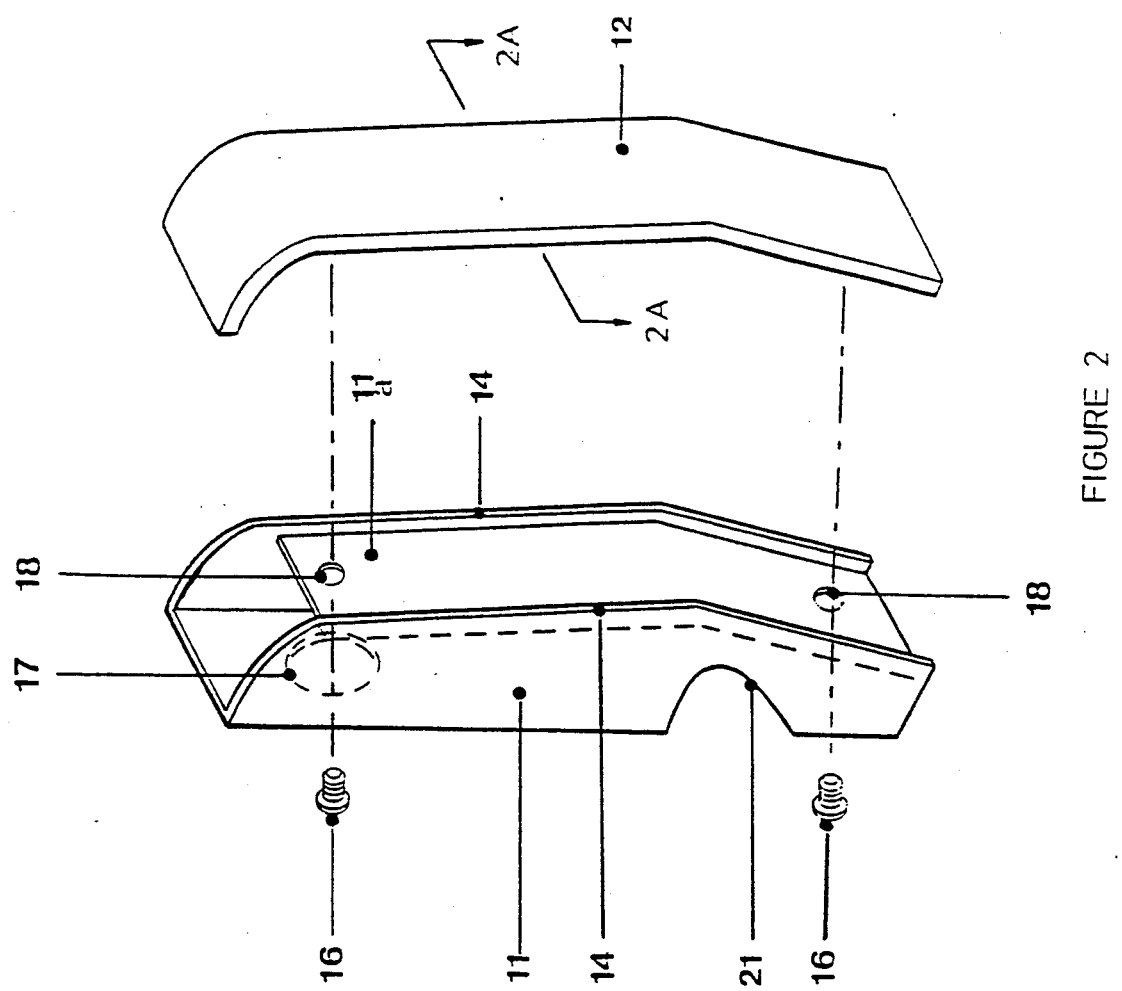

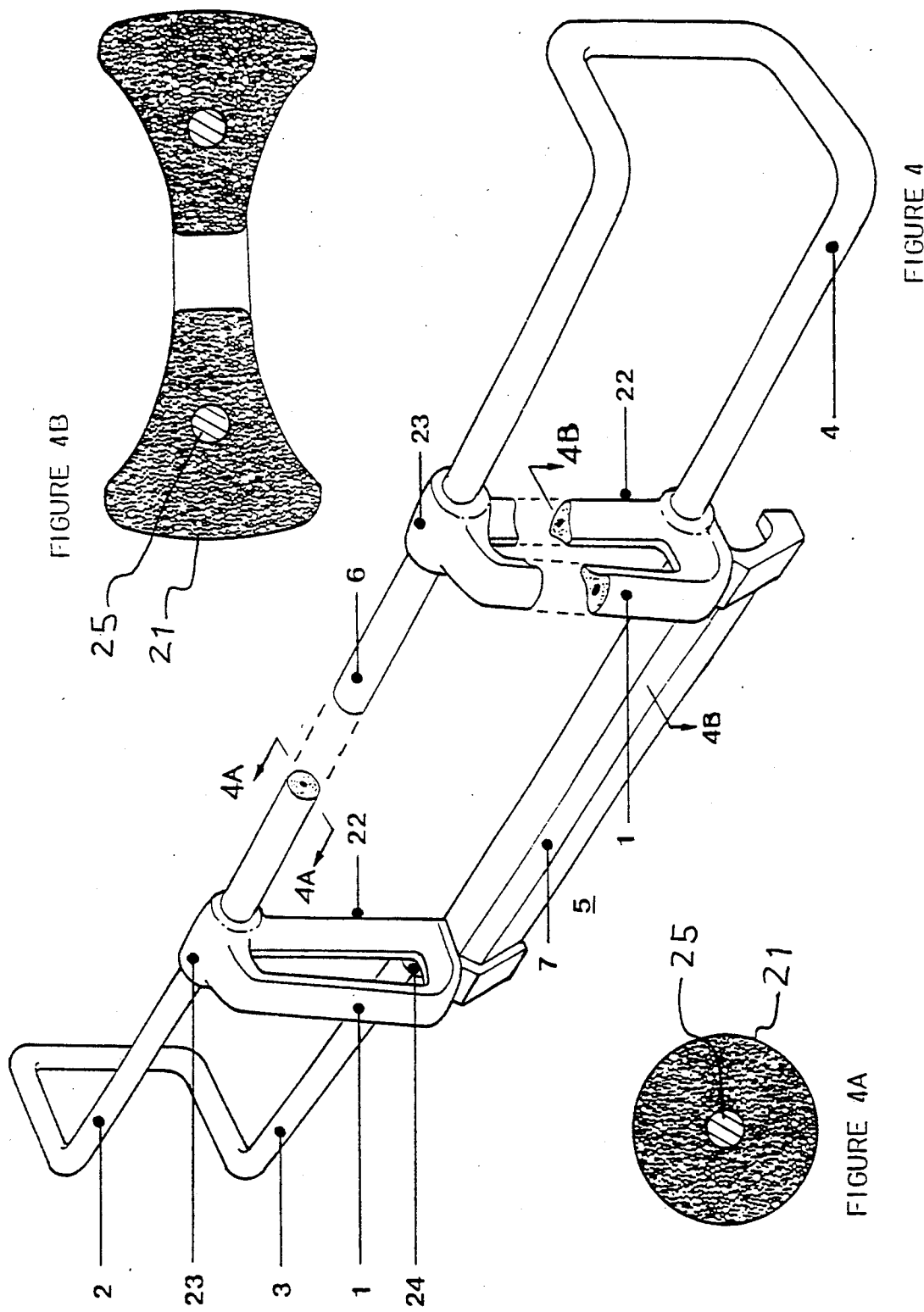

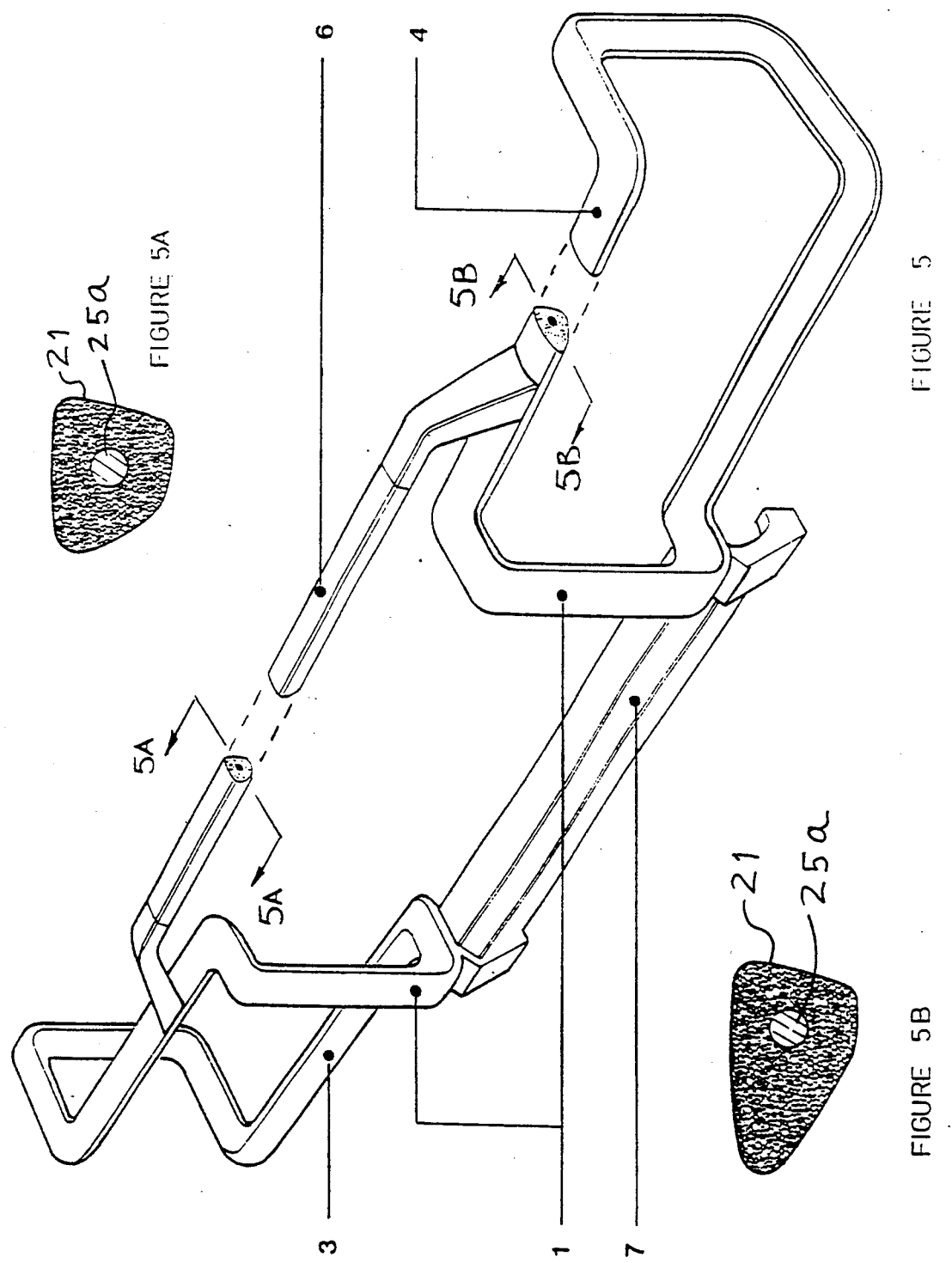

NUDGE BARS

This invention relates to so-called nudge bars for protecting the fronts of vehicles, more particularly cross-country vehicles such as "Land Rovers" and "Range Rovers".

Such nudge bars have been know for many years (e.g. from UK Patent Specification No. 1569052) and comprise a pair of spaced vertical bars whose front surfaces provide the most forward parts of the nudge bar, one on either side of the vehicle radiator and usually a horizontally extending elongate loop which connects with the two vertical bars. The loop usually wraps around from the front to the sides of the vehicle at its ends. As discussed in said UK Patent Specification vehicles at that date were commonly provided with bumper bars but these were not sufficient in many instances to provide the required degree of protection.

Furthermore, since nudge bars known at that date were principally made of metal, for example, sheet metal pressings and extrusions, they were excessively heavy and caused a number of problems.

The object of the present invention is a relatively lightweight and resilient nudge bar which nevertheless functions effectively.

According to the invention, in such a nudge bar, at least the front part of each vertical bar is formed as a moulding of resilient plastics, each moulding is of a semi-rigid, self skinning, foamed polyurethane, and a metal insert in the form of a strip extends through each moulding to strengthen it and to facilitate fixing for example by being tapped to receive fixing bolts or screws.

The use of resilient plastics in a nudge bar in addition to improving the performance of the nudge bar also enables safer and more interesting shapes of nudge bar to be made. For example the front surfaces of the vertical bars can be curved in cross-section to eliminate sharp edges.

Furthermore, the use of foamed polyurethane material provides the strength and resilience needed for absorbing significant impacts, whilst the self-skinning nature of the material provides a durable surface finish resistant to tearing.

As an alternative to making just the front portion of each vertical bar as a moulding of semi-rigid, selfskinning, foamed polyurethane, the whole of each vertical bar may be so formed, the strength of which is determined by the metal insert strip.

Examples of nudge bar in accordance with the invention will now be described by way of example with reference to the accompanying drawings, in which:

FIG. 2 shows an exploded view of one arrangement of a vertical bar of the first construction, FIG. 2A is a cross-sectional view taken along section line 2A—2A, FIG. 2B is a cross-sectional view of the assembled front and rear parts.

FIG. 4 shows a perspective view of a second construction of nudge bar,

FIG. 4A is a cross-sectional view taken along section line 4A—4A,

FIG. 4B is a cross-sectional view taken along section line 4B—4B,

FIG. 5 shows a third construction of nudge bar.

FIG. 5A is a cross-sectional view taken along section line 5A—5A, and

FIG. 5B is a cross-sectional view taken along section line 5B—5B.

Figure 1:
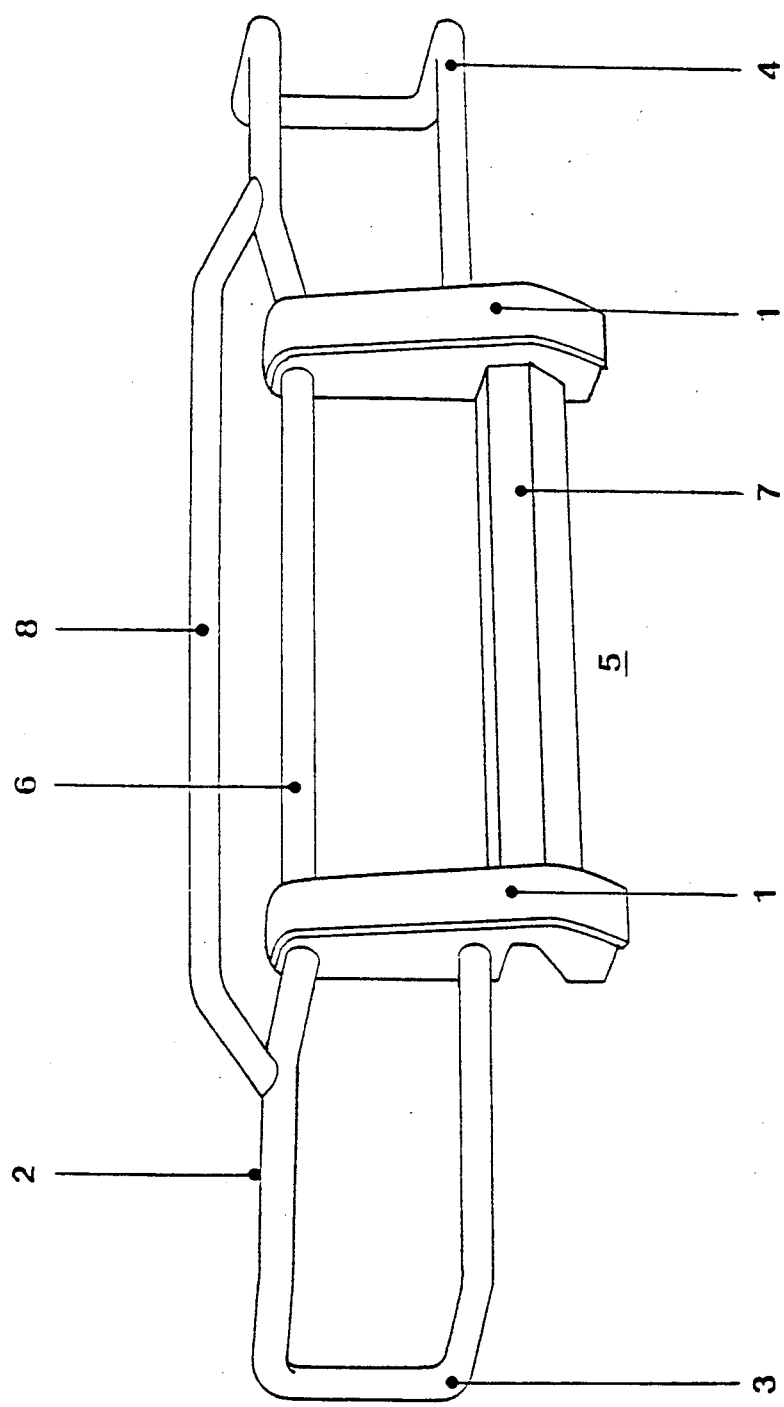
FIG. 1 shows a front view of a first construction of nudge bar.

Referring to FIG. 1, the nudge bar comprises two vertical elongate bars 1 and a horizontally extending elongate loop 2. The loop 2 is formed from two outer tubular sections 3 and 4 which are welded to respective ones of the bar 1 and a central section 5 having an upper tubular bar 6 welded at its ends to the bars 1 and a lower pressed metal member 7 which is shaped to fit over the vehicle bumper and is welded at its ends to the bars 1. A strengthening member 8 of tubular form interconnects the two end sections 3 and 4.

Referring to FIG. 2, in one arrangement, the vertical bars 1 are each formed in two parts, a rear part 11 which is of shaped trough-like form, fabricated from sheet metal, and a front part 12 which is formed as a moulding of semi-rigid, self skinning, foamed polyurethane, through which a metal insert strip 13 extends. The longitudinal side walls of the rear part 11 are connected together near to their edges 14 by an elongate seating plate 11a, said edges projecting forwardly from the plate 11a as shown. The rear face of the moulding 12 has elongate grooves 15, which when the parts 11 and 12 are fitted together receive the edges 14 and enable the inner face of the moulding to seat against the plate 11a. The two parts can be secured together in any convenient manner. For example the insert 13 can be provided with tapped holes, or plain holes and associated captive nuts (not shown) for receiving fixing screws 16 passing from the rear through access holes 17 if needed in the rear wall of the rear trough part 11 and retaining holes 18 in the plate 11a.

Figure 3:
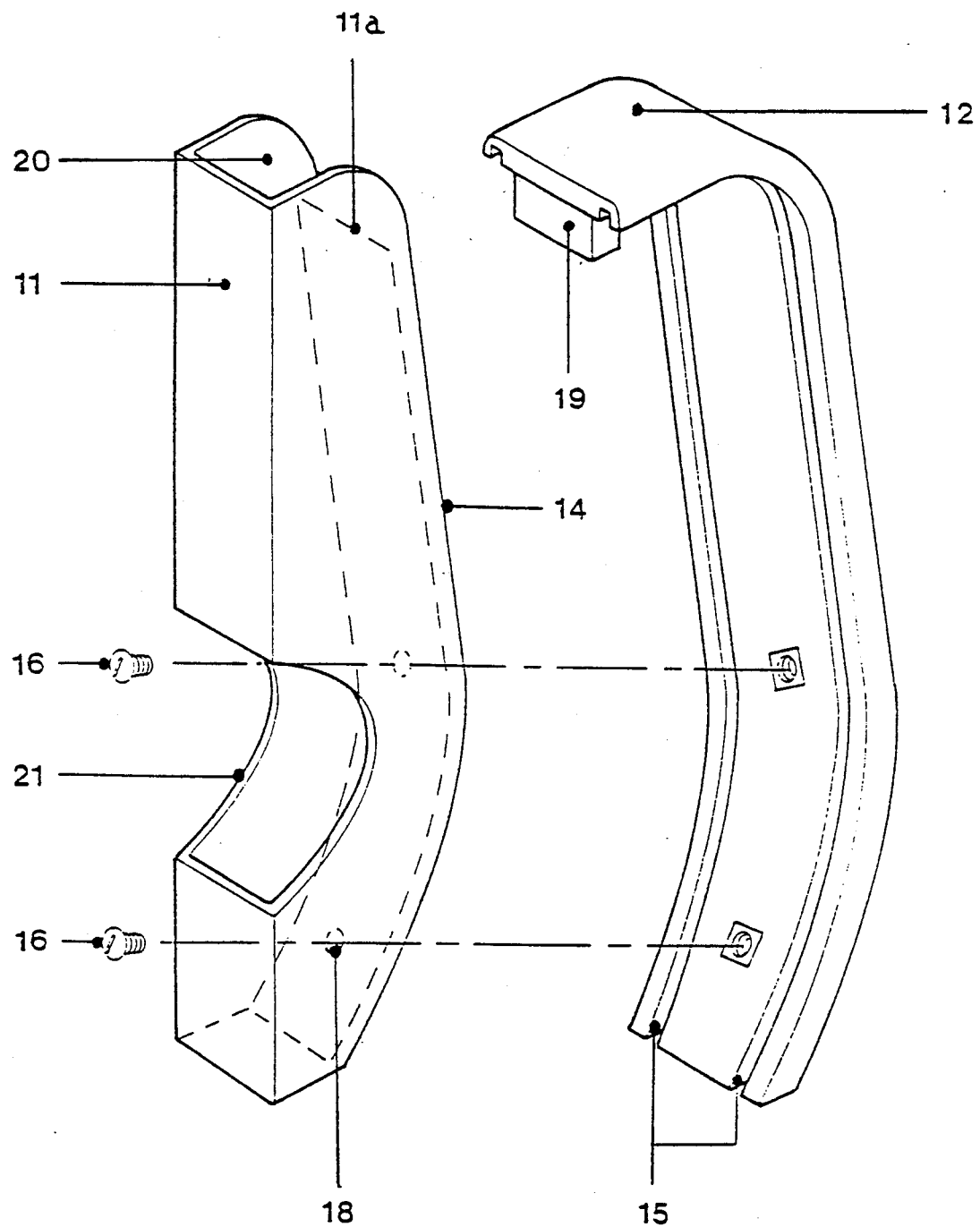
FIG. 3 shows an exploded view of another arrangement of a vertical bar of the first construction.

Referring to FIG. 3, the second arrangement is similar to the first arrangement described above, but includes a peg 19 projecting downwardly from the upper end of the moulded front part 12 which is dimensioned to fit closely within the upper opening 20 defined between the trough part 11 and its plate 11a, the two parts being thereafter connected together at their lower ends by screws 16 and captive nuts in the strip 13. It will be noted in this arrangement that access holes are not required in the rear wall of the part 11 since a rounded cut out 21 is provided to enable the vertical bar to fit closely around the bumper.

The nudge bar can be fixed to the vehicle through fixing brackets (not shown) which can be secured by bolts to the lower ends of the vertical bars 1.

Referring to FIG. 4, this shows a second construction of nudge bar in which the vertical bars 1 are provided by vertical loops 22 moulded from the aforesaid polyurethane material 21 around a metal insert strengthening strip 25. The loops 22 are provided with integral bosses 23 and 24 for receiving the parts 3 to 5 forming the horizontal loop.

Referring to FIG. 5 this shows a construction which is formed wholly from components of the aforesaid polyurethane material 21a moulded around strip metal strengthening strips 25a.

With regard to the constructions according to FIGS. 4 and 5, it will be appreciated that the shape and strength of the vertical bars (FIG. 4) and the vertical and horizontal bars (FIG. 5) is determined by the metal insert strip.

I claim:

1. A vehicle nudge bar, comprising a pair of spaced vertical bars whose front surfaces provide the most forward parts of the nudge bar, one for either side of the vehicle radiator and a horizontally extending elongate loop connected with the two vertical bars, wherein at least a most forward exterior part of each vertical bar is formed as a moulding of resilient plastics, wherein each moulding is of a semi-rigid, self skinning, foamed polyurethane, and wherein a metal insert in the form of a strip extends through each moulding to strengthen said moulding forming each of said vertical bars.

2. A nudge bar according to claim 1, wherein each vertical bar comprises a rear metal part and said most forward exterior moulded part, wherein the metal part provides projecting front edges which mate with corresponding grooves in the moulded part, and wherein a plate is provided in the metal part, adjacent the said front edges on which the moulded part seats when fitted.

3. A nudge bar according to claim 2, wherein the metal part and the moulded part are fixed together by screws fitting into one of tapped holes and captive nuts provided in said metal insert strip.

4. A nudge bar according to claim 3, wherein one end of the moulded part is provided with a peg which is adapted to fit into an opening defined in the corresponding end of the metal part to facilitate fixing of said moulded part to said metal part.

5. A nudge bar according to claim 1, wherein each vertical bar is made wholly as a moulding of semi-rigid, self skinning, foamed polyurethane, the strength of which is determined by the metal insert strip extending through each moulding.

6. A nudge bar according to claim 5, wherein the horizontal loop is also made wholly of resilient plastics or rubber material, the shape and strength of which is determined by a metal insert strip extending through the horizontal loop.

7. A vehicle nudge bar, comprising a pair of spaced vertical bars whose front surfaces provide the most forward parts of the nudge bar, one for either side of the vehicle radiator and a horizontally extending elongate loop connected with the two vertical bars, wherein at least a most forward part of each vertical bar is formed as a moulding of resilient plastics, wherein each moulding is of a semi-rigid, self skinning, foamed polyurethane, and wherein a metal insert in the form of a strip extends through each moulding to strengthen said moulding forming each of said vertical bars; and wherein each vertical bar comprises a rear metal part and said most forward exterior moulded part, wherein said metal part provides projecting front edges which mate with corresponding grooves in the moulded part, and wherein a plate is provided in the metal part, adjacent the projecting front edges, and on which the moulded part seats when fitted to the metal part.

* * * * *